(No Model.)  C. F. SEARCH.  4 Sheets—Sheet 1.
TREAD POWER.

No. 591,660.  Patented Oct. 12, 1897.

(No Model.) 4 Sheets—Sheet 2.

C. F. SEARCH.
TREAD POWER.

No. 591,660. Patented Oct. 12, 1897.

Witnesses:
Geo. W. Fuiny
Chas. L. Goss

Inventor:
Casper F. Search
By Winter, Flanders, Smith, Bottum & Vilas
Attorneys.

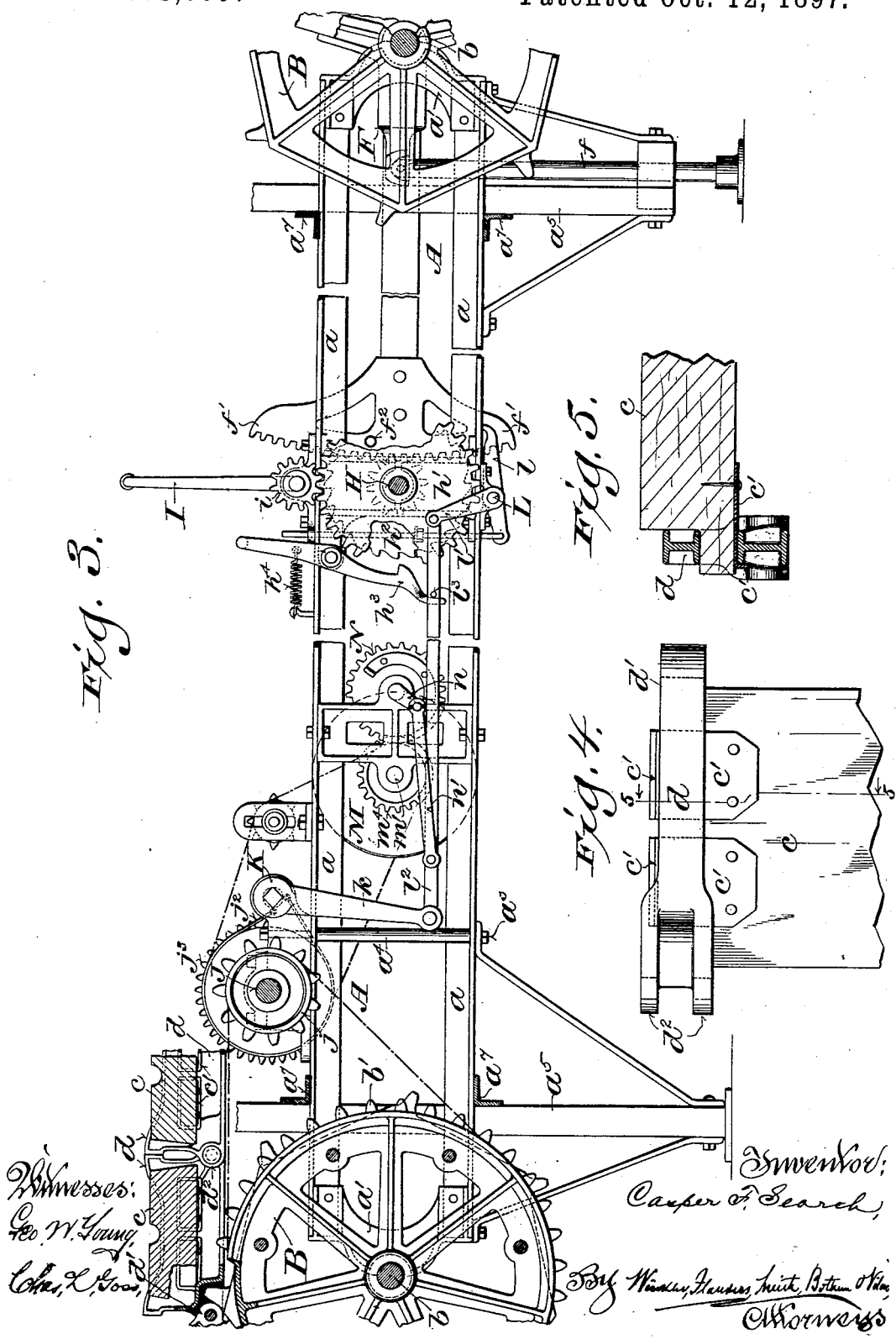

(No Model.) 4 Sheets—Sheet 4.
C. F. SEARCH.
TREAD POWER.
No. 591,660. Patented Oct. 12, 1897.
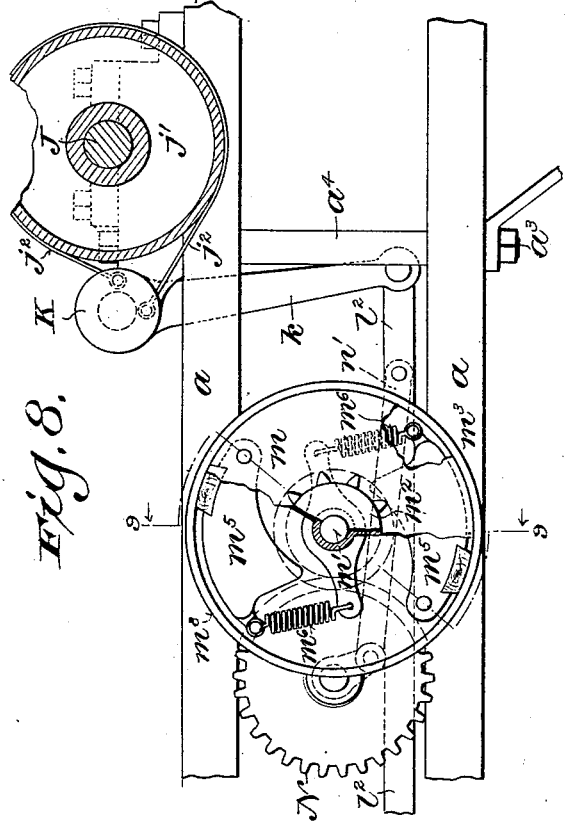
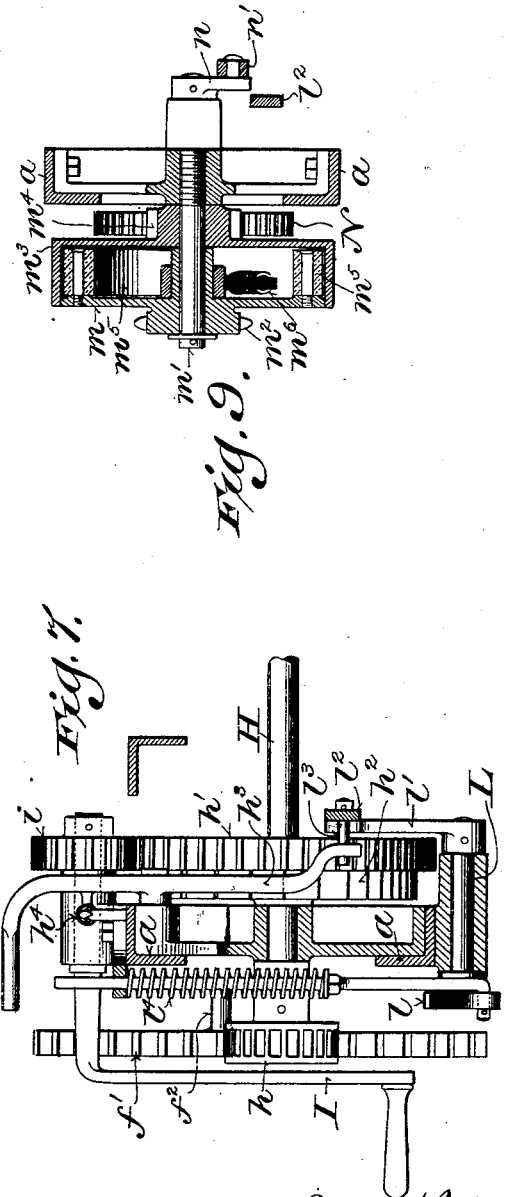
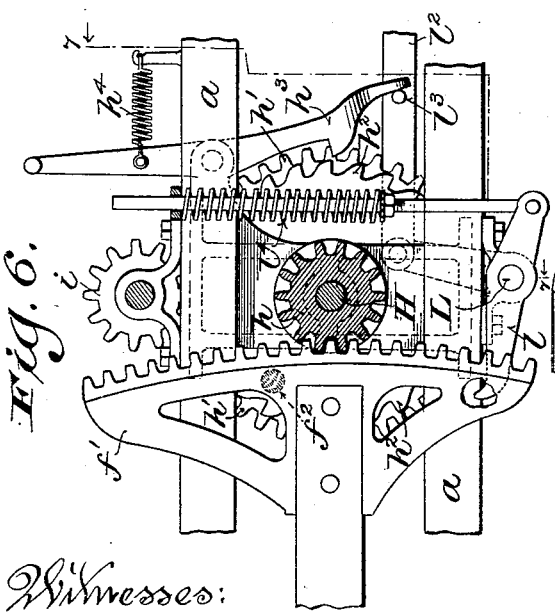
Witnesses:
Geo. W. Young.
Chas. L. Goss.
Inventor:
Casper F. Search,
By Winkler, Flanders, Smith, Bottum & Vilas,
Attorneys.

UNITED STATES PATENT OFFICE.

CASPER F. SEARCH, OF OAK PARK, ILLINOIS, ASSIGNOR TO THE SEARCH MANUFACTURING COMPANY, OF SHEBOYGAN FALLS, WISCONSIN.

TREAD-POWER.

SPECIFICATION forming part of Letters Patent No. 591,660, dated October 12, 1897.

Application filed June 5, 1897. Serial No. 639,503. (No model.)

*To all whom it may concern:*

Be it known that I, CASPER F. SEARCH, of Oak Park, in the county of Cook and State of Illinois, have invented certain new and useful Improvements in Tread-Powers; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to relieve the animals employed to propel the machine of unnecessary work, and to that end to utilize the draft instead of the weight of the animals to drive the apron by setting the apron in an approximately horizontal position and suspending the rear part of the machine from the draft connection, and generally to improve the construction and operation of machines of this class.

It consists, essentially, of a draft connection for suspending the rear end of the machine and enabling the animal or team to propel the apron in a substantially horizontal position, a governor connection for taking off the load off from the draft connection whenever the apron attains a certain speed, and of certain novel features and details in the construction and arrangement of component parts of the machine, as hereinafter particularly described, and pointed out in the claims.

In the accompanying drawings like letters designate the same parts in the several figures.

Figure 1:
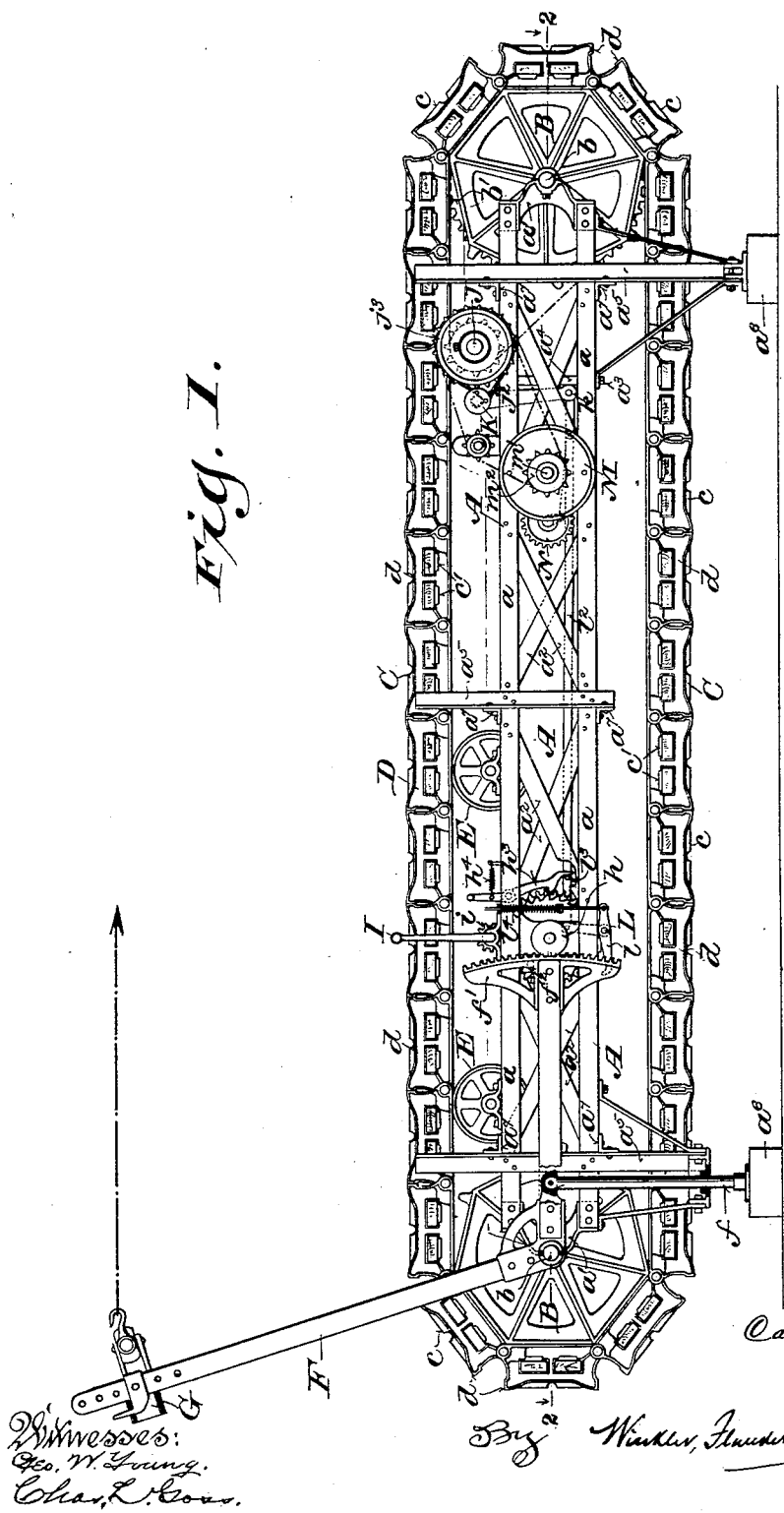
Figure 2:
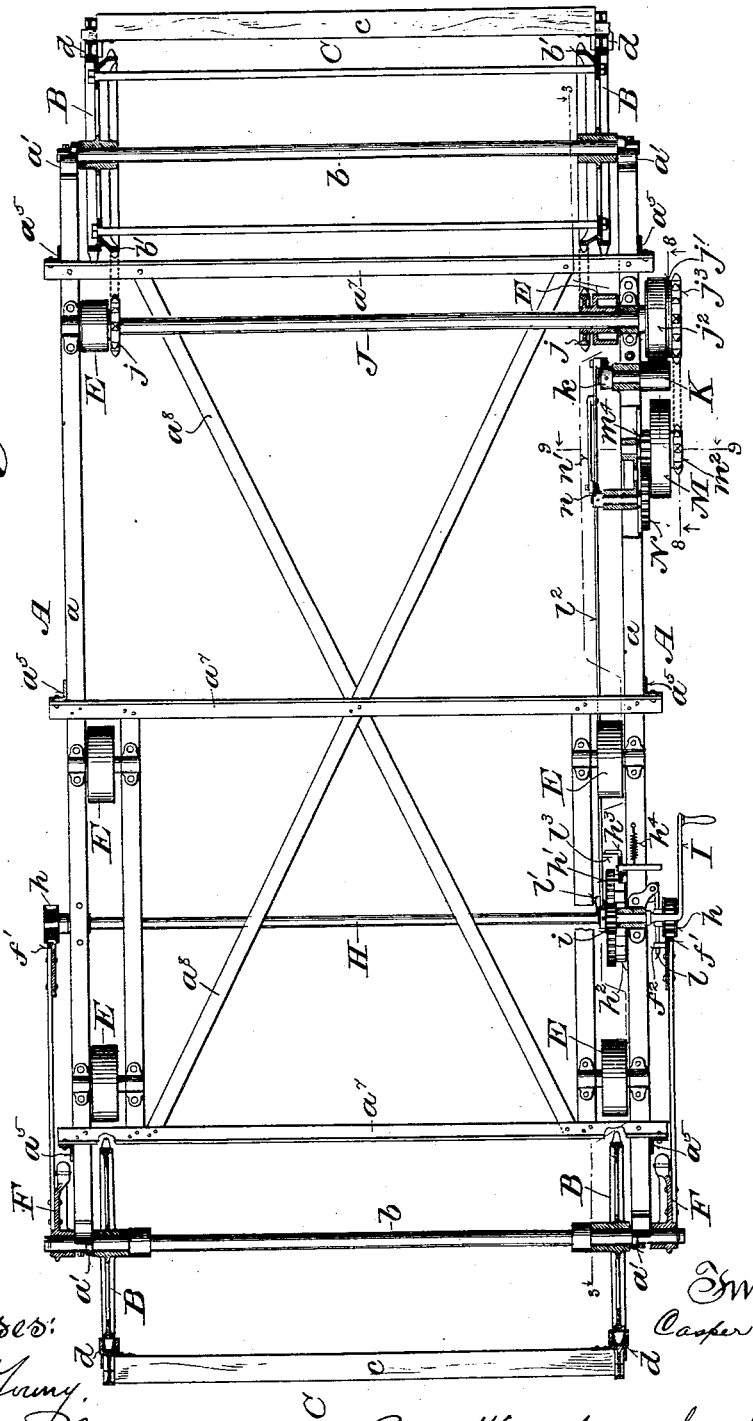

Figure 1 is a side elevation of a machine embodying my improvements, the frame or rails for keeping the animal or animals in place being removed. Fig. 2 is a plan view and horizontal section on the line 2 2, Fig. 1, the upper part of the apron being removed. Fig. 3 is an enlarged vertical longitudinal section on the line 3 3, Fig. 2. Figs. 4 and 5 are detail views, on an enlarged scale, of one of the links of the apron-carrying chains or belts, Fig. 4 being an inverted plan or a view of the bearing-face of the link, and Fig. 5 a vertical section on the line 5 5, Fig. 4, showing the method of securing the lags in the links of the chain belts. Fig. 6 is an enlarged elevation of the manual lifting mechanism and of the locking device. Fig. 7 is a vertical section on the line 7 7, Fig. 6. Fig. 8 is an enlarged vertical section on the line 8 8, Fig. 2, showing the governor and brake; and Fig. 9 is a vertical section of the governor on the line 9 9, Figs. 2 and 8.

A designates the frame, which for convenience, lightness, and strength is preferably constructed of metal. Each side of the frame is composed of longitudinal angle-bars $a\ a$, which are connected at the ends by castings $a'$ and at intervals between the ends by diagonal braces $a^2$ and tie-rods $a^3$, surrounded by spacing-tubes $a^4$, which bear at the ends against the flanges of the angle-bars and may be conveniently made of sections of gas-pipe.

To the outer sides of the angle-bars are bolted or riveted angle-bar uprights $a^5$, which serve as attachment-plates for the uprights of the side frames or gates for holding the horses upon the apron. The end uprights $a^5$ are extended below the frame and serve as legs for the machine to stand upon and to elevate the sprocket-wheels and apron above the floor or foundation which supports the machine. These legs are suitably braced and are supported by cross-sills $a^6$, to which the front legs are permanently fastened. The sides of the frame are connected in the usual or any suitable manner by cross-bars $a^7$ and braced diagonally by bars $a^8$.

By the construction above described I am enabled to produce a light, rigid, open frame, the longitudinal angle-bars of the sides being arranged at a sufficient distance from each other to produce a stiff structure affording convenient openings for the passage of the cross-shafts and the desired arrangement of the mechanism, hereinafter described.

B B are sprocket-wheels for carrying the endless apron, mounted to turn upon cross-shafts $b\ b$, which are secured at their ends in the castings $a'$.

C is the endless apron, consisting of the usual wooden lags $c\ c$, which are secured and carried at the ends in the links of chain belts D, as shown in detail in Figs. 4 and 5. The component links $d$ of the chain belts are each made of oblong quadrangular form, with a single transversely-perforated ear $d'$ at one corner and two transversely-perforated ears $d^2$ at the corresponding corner on the other end of the link, and an intervening recess between said ears $d^2$, opening at the end of the link to receive the single ear of the next link, which is connected therewith by a pivot pin or bolt. This recess is extended toward the center of the link and opens through its bearing-face to form a cavity or pocket for the reception and engagement of the sprockets on the apron-carrying wheels B. The lags $c$, made in the usual way of hardwood plank, are formed at the ends with tenons, which are loosely fitted and inserted in transverse openings or sockets in the links $d$, and secured therein by thin metal plates $c'$, nailed to the under or inner sides of the lags and bent at their outer edges over the outer faces of the links, as shown in Fig. 5. The ends of the links are extended outwardly in line with their pivot connections at right angles to their inner bearing-faces to form abutments by which the upper side of the apron is made self-sustaining and is rigidly held approximately level or flat.

To take the strain off the apron and to cause it to run smoother and easier, plain-faced supporting-rollers E E may be mounted upon the frame A, with their tops in line with the tops of the sprocket-wheels B, so as to bear against and support the under sides of the links $d$, which are made plain and straight, as shown.

F F are bell-crank levers pivotally mounted at their elbows upon the ends of the rear sprocket-wheel shaft $b$. Their longer upwardly-extending arms carry a vertically-adjustable cross-bar G, which serves as a draft attachment. The shorter forwardly-extending and horizontally-disposed arms of these levers are fulcrumed to the upper ends of thrust-bars or standards $f$, which pass loosely through holes in the feet of the rear legs $a^5$ and are fastened at their lower ends to the rear cross-sill $a^6$. The horizontal arms of said levers are extended forward toward the head of the machine beyond the thrust-rods $f$ and are provided at their front ends with segment-gears $f'$, concentric with the rear shaft $b$.

H is a cross-shaft supported in bearings in the sides of the frame parallel with the rear sprocket-wheel shaft $b$ and provided at the ends with pinions $h$, which mesh with the segment-gears $f'$. It is also provided with a gear $h'$ and a ratchet-wheel $h^2$, fixed thereon near one side of the machine, as shown in Figs. 2 and 3.

I is a crank the shaft of which is supported in a bearing in one side of the frame parallel with the shaft H and provided with a pinion $i$, which meshes with the gear $h'$. By means of this crank the rear end of the machine may be raised and lowered for starting and stopping, as hereinafter explained.

$h^3$ is a detent or pawl pivoted to the frame, as shown in Figs. 3 and 6, and forced by a spring $h^4$ toward the ratchet-wheel $h^2$, with which it engages when released.

J is the power or driving shaft, supported near the front end of the machine by bearings in the frame A, parallel with the front shaft $b$, and provided with sprocket-wheels $jj$, which are connected by chain belts with larger sprocket-wheels $b' b'$ on said shaft $b$, as shown in Figs. 2 and 3. Upon the shaft J at one side of the machine, as shown in Figs. 2 and 8, is fixed a friction brake-wheel $j'$, encircled by a brake-strap $j^2$, the ends of which are attached to a head K on a rock-shaft provided with a depending arm $k$.

L is a rock-shaft supported by a bearing in one side of the frame below and parallel with the shaft H and provided at its outer end with an arm $l$ in the path of a pin or projection $f^2$ on the adjacent segment-gear $f'$, as shown in Figs. 6 and 7, and at its inner end with an arm $l'$, which is connected by a rod $l^2$ with the brake-arm $k$. The rod $l^2$ is provided with a pin or projection $l^3$, as shown in Figs. 2 and 6, adapted to engage with and to force and hold the detent $h^3$ out of engagement with the ratchet-wheel $h^2$. A spring $l^4$, surrounding a rod which is connected with an extension of the arm $l$, tends to carry and hold the brake-rod $l^2$ forward, thereby releasing the brake and holding the detent $h^3$ out of engagement with the ratchet-wheel $h^2$, as shown in Fig. 3.

M is a centrifugal governor which consists, as shown in Figs. 8 and 9, of a disk $m$, mounted to turn upon a stud $m'$ and provided with a sprocket-wheel $m^2$, which is connected by a chain belt with a sprocket-wheel $j^3$ on the driving-shaft J; of a disk $m^3$, also mounted upon the stud $m'$ and formed or provided with a rim or flange next to the disk $m$ and with a pinion $m^4$, and of weighted friction-shoes $m^5$, pivoted to the disk $m$, so as to be turned outwardly by centrifugal force against the tension of springs $m^6$ into engagement with the rim of the disk $m^3$. The pinion $m^4$ meshes with a gear N on a short rock-shaft carried by a bearing in the frame parallel with the driving-shaft J and provided with an arm $n$, which is connected by a link $n'$ with the brake-rod $l^2$. The tension of the springs $m^6$ may be varied and adjusted by turning the sleeve to which they are attached on the hub of the disk $m$.

My improved machine operates as follows: For leading the horses into the machine the crank I is turned to the right, as shown in Fig. 1, thereby turning the segment-gears $f'$ down, swinging the upwardly-extending arms of the levers F forward and raising the rear legs $a^5$ out of contact with the cross-sill $a^6$ or the feet of the thrust-rods $f$, upon which they rest when the machine is not in use. As the rear ends of the frame and apron approach the limit of their upward movement the pin $f^2$ engages the arm $l$ of the rock-shaft L and moves the brake-rod $l^2$ backward against the tension of the spring $l^4$, thus applying the brake-strap $j^2$ to the brake-wheel $j'$ and holding the apron stationary and releasing the detent $h^3$, which is forced by the spring $h^4$ into engagement with the ratchet-wheel $h^2$, locking the lifting mechanism against the descent of the machine. The horse or horses, being led into the machine, are hitched to the draft-bar G by means of a whiffletree when a single horse is used, and a pair of whiffletrees and evener when a pair of horses is employed, the traces being taken up or adjusted so that when the horses move backward as far as they can the feet of the rear legs $a^5$ will not rest upon the cross-sill. To start the machine, the detent $h^3$ is turned, by means of a handle at its upper end, out of engagement with the ratchet-wheel $h^2$ and the crank I is turned to the left, as shown in Fig. 1, thus allowing the machine to descend and throwing a portion of its weight and that of the horses upon the draft connection through the levers F. The load to which the horses are thus subjected tends to draw the upper side of the apron backward, compelling them to travel forward as the upper side of the apron moves under them. The movement of the apron is communicated from the sprocket-wheel $b'$ through the connecting chain belts to the sprocket-wheels $j$ and the driving-shaft J, from which the power is taken in the usual way to drive machinery and to do the desired work. The power or force with which the shaft J is turned depends upon the load which is sustained through the levers F by the draft connection, and may be regulated by raising or lowering the draft-bar G, which increases or decreases the leverage of the team upon the weight which they are required to sustain, and consequently upon the resistance to the movement of the apron which is to be overcome.

The governor being constructed and adjusted to apply the brake at a certain speed, whenever that speed is attained the shoes $m^5$ are turned outward by centrifugal force against the tension of springs $m^6$ into engagement with the rim of disk $m^3$, thereby locking it with the disk $m$, which is constantly turned through its connection with the driving-shaft. When this occurs, the arm $n$ will be turned to the left, as shown in Fig. 3, or to the right, as shown in Fig. 8, and, through the brake-rod $l^2$, arm $k$, and head K, will tighten the brake-strap $j^2$ upon the brake-wheel $j'$, thereby checking the speed of the machine and of the governor, which will thereupon release the brake. The movement of the brake-rod $l^2$ by the governor in applying the brake also carries the pin or projection $l^3$ out of engagement with the detent $h^3$, which is thereupon thrown by the spring $h^4$ into engagement with the ratchet-wheel $h^2$, thereby locking the lifting mechanism against the descent of the machine and taking its weight off the draft connection until the speed of the driving-shaft is reduced to its normal rate, whereupon the governor ceasing to act upon the brake-rod the spring $l^4$ will move it forward, releasing the brake and disengaging the detent $h^3$. Thus it will be seen that whenever during the operation of the machine its speed is accelerated by a reduction of work or resistance to its movement the horses will be automatically relieved of load or draft and the speed of the driving-shaft and apron will be automatically checked by the governor; but whenever work is resumed requiring more power the load will be again applied to the horses through the draft connection, enabling them to move the apron with such force as is required in precisely the same manner as they would draw a load on a level road. The horses are thus relieved from unnecessary work and are enabled to work in an ordinary natural position with freedom of movement and under the most favorable conditions. When the machine runs without doing work, the horses simply travel over the apron without pulling, the weight of the machine being sustained under these conditions by the lifting mechanism, which is automatically locked in the manner above explained.

To unhitch and remove the horses and to stop the machine, the crank I is turned so as to raise the rear end of the apron to the limit of its movement, thus applying the brake and locking the lifting mechanism.

The speed of the machine may be regulated by varying the tension of the spring $l^4$, against which the governor acts in applying the brake. This is effected by the adjustment of the nut against which the spring bears on the screw-rod carrying the spring.

I do not wish to be understood as limiting myself to exact details of construction herein shown and described, as they may be variously modified within the intended scope of my invention.

I claim—

1. In a tread-power the combination with a frame and an endless apron mounted upon suitable wheels carried by said frame, of a draft-lever connection between the rear end of said frame and its support, whereby the draft of the team or animal tends to lift the rear end of the machine, substantially as and for the purposes set forth.

2. In a tread-power the combination with a frame and an endless apron mounted upon suitable wheels carried by said frame, of a lever connection between the rear end of the frame and its support having an adjustable draft connection, substantially as and for the purposes set forth.

3. In a tread-power the combination with a frame and an endless apron mounted upon suitable wheels carried by said frame, of uprights with which the rear end of the frame has guiding connections, and bell-crank levers pivotally connected with the rear part of the frame, fulcrumed by their shorter horizontally-disposed arms to said uprights and having their longer arms extending upwardly and provided with a draft connection, substantially as and for the purposes set forth.

4. In a tread-power the combination with a frame and an endless apron mounted upon suitable wheels carried by said frame, of lifting-levers pivoted to said frame, fulcrumed to stationary supports and provided with a draft connection, and means connected with said levers for manually raising and lowering the rear end of the machine and for locking it in an elevated position, substantially as and for the purposes set forth.

5. In a tread-power the combination with a frame and an endless apron mounted upon suitable wheels carried by said frame, of draft-levers connected with and arranged to lift the rear end of the machine, and a governor adapted to lock said levers when the machine attains a certain speed, substantially as and for the purposes set forth.

6. In a tread-power the combination with a frame and an endless apron mounted upon suitable wheels carried by said frame, of draft-levers connected with and arranged to lift and sustain the rear end of the machine, a brake for stopping or checking the movement of said apron, and a governor arranged to apply said brake when the machine attains a certain speed, substantially as and for the purposes set forth.

7. In a tread-power the combination with a frame and an endless apron mounted upon suitable wheels carried by said frame, of draft-levers connected with and arranged to lift and sustain the rear end of the machine, a brake for stopping or checking the movement of said apron, and a governor adapted to lock said levers and take the weight of the machine off from the draft connection and to apply the brake, when the machine attains a certain speed, substantially as and for the purposes set forth.

8. In a tread-power the combination with a frame and an endless apron mounted upon suitable wheels carried by said frame, of draft-levers connected with and arranged to lift and sustain the rear end of the machine, a cross-shaft carried by said frame and provided with pinions meshing with segment-gears on said levers, and a crank connected with said cross-shaft for manually lifting the machine, substantially as and for the purposes set forth.

9. In a tread-power the combination with a frame and an endless apron mounted upon suitable wheels carried by said frame, of draft-levers connected with and arranged to lift the rear end of the machine, a cross-shaft carried by said frame and provided with pinions which mesh with segment-gears on said levers, a crank connected with said shaft, a brake for stopping and holding the apron, and a rocking arm connected with said brake and located in the path of a projection on one of said segment-gears for applying the brake when the machine is elevated by the draft-levers, substantially as and for the purposes set forth.

10. In a tread-power the combination with a frame and an endless apron mounted upon suitable wheels carried by said frame, of draft-levers connected with and arranged to lift the rear end of the machine, a cross-shaft carried by said frame and provided with pinions which mesh with segment-gears on said levers, a ratchet-wheel on said cross-shaft, a detent adapted to engage with said ratchet-wheel and to lock said levers against the descent of the machine, a spring tending to carry said detent into engagement with said ratchet-wheel, a brake for stopping or checking the movement of said apron, a brake-rod for applying said brake adapted when the brake is released to hold said detent out of engagement with the ratchet-wheel, a governor arranged to apply the brake when the machine attains a certain speed, and a spring acting in opposition to the governor upon the brake mechanism and holding the brake and detent normally disengaged, substantially as and for the purposes set forth.

11. In a tread-power the combination with a frame and an endless apron mounted upon suitable wheels carried by said frame, of a draft connection connected with and arranged to lift and sustain the rear end of the machine when it is working, and an automatic locking device for holding said lifting mechanism against the descent of the machine when it is elevated to the extent of its upward movement, substantially as and for the purposes set forth.

12. In a tread-power the combination with a frame and an endless apron mounted upon suitable wheels carried by said frame, of lifting mechanism having a draft attachment, and connected with and arranged to sustain the rear end of the machine when it is working, a locking device for holding said lifting mechanism against the descent of the machine, a brake for stopping or checking the movement of the apron, and having a connection for operating said locking device, a governor for applying said brake when the machine attains a certain speed, and an adjustable spring tending to release said brake mechanism, substantially as and for the purposes set forth.

13. In a tread-power the combination with a frame and an endless apron mounted upon suitable wheels carried by said frame, of angular lifting-levers pivoted to the rear part of said machine and having horizontally-disposed arms fulcrumed to stationary supports and provided with segment-gears concentric with their pivots, and also having upwardly-extending arms provided with a vertically-adjustable draft-bar, a cross-shaft carried by said frame and provided with a ratchet-wheel and pinions meshing with said segment-gears, means for manually turning said shaft and lifting or lowering the machine, a detent, a spring tending to hold said detent in engagement with said ratchet-wheel, a brake for stopping or checking the movement of the apron, a longitudinally-movable rod for operating said brake, a centrifugal governor connected with said rod and arranged to apply the brake when the machine attains a certain speed, a rock-shaft having an arm connected with said brake-rod and an arm in the path of a projection on one of said segment-gears, and an adjustable spring acting on said rock-shaft in opposition to the governor, the brake-rod having a projection adapted to engage with said detent and hold it normally out of contact with said ratchet-wheel, substantially as and for the purposes set forth.

14. In a tread-power the combination with sprocket-wheels, of an endless apron carried by chain belts mounted upon said sprocket-wheels and composed of links each of which is formed at one corner with a single transversely-perforated ear and at the corresponding corner on the other end with two transversely-perforated ears and a recess to receive the single ear of the next link which is connected therewith by a pivot pin or bolt, and to form a pocket for the engagement of the sprockets, the ends of the links being constructed and arranged to abut against each other above their pivot connections and to stiffen and hold the upper side of the apron straight, substantially as and for the purposes set forth.

15. A chain belt for tread-powers composed of oblong quadrangular links formed with transverse mortises or sockets to receive end tenons on the lags, each link being formed at one corner with a single transversely-perforated ear and at the corresponding corner on the other end with two transversely-perforated ears and an intervening recess open at the end to receive the single ear of the next link and opening in the bearing-face of the link to receive sprockets of the carrying-wheels, the ends of the links having abutting faces perpendicular to their bearing-faces and in line with their pivot connections, substantially as and for the purposes set forth.

16. In a tread-power the combination with the lags of the apron having end tenons and links of a chain belt having transverse mortises or openings to receive said tenons, of fastenings for holding the tenons in the mortises consisting of sheet-metal plates fastened to the under sides of the lags and extending with their tenons through the links and bent at their outer edges over the outer faces of the links, substantially as and for the purposes set forth.

In testimony that I claim the foregoing as my own I affix my signature in presence of two witnesses.

CASPER F. SEARCH.

Witnesses:
CHAS. L. GOSS,
M. L. EMERY.